US012187589B2

(12) United States Patent
Radenslaben

(10) Patent No.: US 12,187,589 B2
(45) Date of Patent: Jan. 7, 2025

(54) BOOM ATTACHMENT WITH ROTATION ABOUT MULTIPLE AXES

(71) Applicant: Elliott Equipment Company, Omaha, NE (US)

(72) Inventor: Terry Radenslaben, Omaha, NE (US)

(73) Assignee: Westchester Capital LLC, Omaha, NE (US)

( * ) Notice: Subject to any disclaimer, the term of this patent is extended or adjusted under 35 U.S.C. 154(b) by 1155 days.

(21) Appl. No.: 17/016,613

(22) Filed: Sep. 10, 2020

(65) Prior Publication Data

US 2021/0114850 A1 Apr. 22, 2021

Related U.S. Application Data

(60) Provisional application No. 63/017,041, filed on Apr. 29, 2020, provisional application No. 62/916,834, filed on Oct. 18, 2019.

(51) Int. Cl.
*B66F 11/04* (2006.01)
*B66F 9/14* (2006.01)

(52) U.S. Cl.
CPC ............ *B66F 11/046* (2013.01); *B66F 9/146* (2013.01); *B66F 9/147* (2013.01)

(58) Field of Classification Search
CPC ........ B66F 11/046; B66F 9/146; B66F 9/147; B66F 11/044; B66C 23/66
See application file for complete search history.

(56) References Cited

U.S. PATENT DOCUMENTS 3,224,528 A * 12/1965 Hubbard ............... B66F 11/046 182/2.8
3,299,983 A * 1/1967 Hubbard ............... B66F 11/046 182/2.11
3,572,530 A * 3/1971 Ohntrup .................. B66F 9/147 414/666
4,512,436 A 4/1985 Freudenthal et al.
5,727,645 A * 3/1998 Woodling ............. B66F 11/046 182/2.11
5,944,138 A * 8/1999 Vollmer ................ B66F 11/044 182/2.1

(Continued)

FOREIGN PATENT DOCUMENTS

WO 2006086685 A3 4/2009
WO WO-2016176782 A1 * 11/2016 ........... B66C 23/702

*Primary Examiner* — Michael R Mansen
*Assistant Examiner* — Juan J Campos, Jr.
(74) *Attorney, Agent, or Firm* — Daniel J. Honz; Advent, LLP

(57) ABSTRACT

Systems and methods for providing a rotatable boom attachment that is rotatable about at least two different axes with respect to an attached boom are described. A system embodiment includes, but is not limited to, a body portion configured to couple to a distal end of a boom, the body portion coupled with a rotational actuator configured to rotate the body portion about a first rotational axis with respect to the boom; a connecting arm rotatably coupled to the body portion; and a motor configured to drive the connecting arm about a second rotational axis having an orientation differing from the first rotational axis, wherein at least one of the body portion or the connecting arm includes a mounting site configured to removably couple to one or more implements.

15 Claims, 11 Drawing Sheets

(56) References Cited

U.S. PATENT DOCUMENTS

| | | | | |
|---|---|---|---|---|
| 8,833,519 | B1 | 9/2014 | Glazer et al. | |
| 8,857,567 | B1 * | 10/2014 | Raymond | B66C 23/702<br>182/2.1 |
| 2010/0276386 | A1 | 11/2010 | Schneider | |
| 2013/0313044 | A1 * | 11/2013 | Stewart | B66F 11/046<br>182/63.1 |
| 2015/0307337 | A1 | 10/2015 | Ewert | |
| 2018/0134533 | A1 * | 5/2018 | Ewert | B66C 23/702 |
| 2018/0195589 | A1 | 7/2018 | Mark | |

* cited by examiner

BOOM ATTACHMENT WITH ROTATION ABOUT MULTIPLE AXES

CROSS-REFERENCE TO RELATED APPLICATIONS

The present application claims the benefit of 35 U.S.C. § 119(e) of U.S. Provisional Application Ser. No. 62/916,834, filed Oct. 19, 2019, and titled "BOOM ATTACHMENT WITH ROTATION ABOUT MULTIPLE AXES" and of U.S. Provisional Application Ser. No. 63/017,041, filed Apr. 29, 2020, and titled "BOOM ATTACHMENT WITH ROTATION ABOUT MULTIPLE AXES." U.S. Provisional Application Ser. Nos. 62/916,834 and 63/017,041 are herein incorporated by reference in their entireties.

BACKGROUND

Vehicle-mounted telescopic booms are utilized to provide access to otherwise inaccessible locations, such as elevated surfaces and equipment. The booms can be rotatably mounted to a vehicle to transport the boom to a location and swing the boom about the vehicle base while extending a distal end of the boom from the truck. Booms typically support equipment or a utility platform on the distal end of the boom to allow tools and personnel to perform tasks at the location from an elevated position. For example, a boom can extend and raise a utility platform to support a utility worker and/or equipment and provide access to an overhead electric power line or equipment for maintenance, installation, or the like.

SUMMARY

Systems and methods for providing a rotatable boom attachment that is rotatable about at least two different axes with respect to the boom to which the rotatable boom attachment is mounted are described. In an aspect, a system embodiment includes, but is not limited to, a body portion configured to couple to a distal end of a boom, the body portion coupled with a rotational actuator configured to rotate the body portion about a first rotational axis with respect to the boom; a connecting arm rotatably coupled to the body portion; and a motor configured to drive the connecting arm about a second rotational axis having an orientation differing from the first rotational axis, wherein at least one of the body portion or the connecting arm includes a mounting site configured to removably couple to one or more implements.

In an aspect, a system embodiment includes, but is not limited to, a body portion configured to couple to a distal end of a boom, the body portion defining an interior region formed from a top plate coupled with a first side plate and a second side plate opposing the first side plate; a rotational actuator positioned at least partially within the interior region and coupled between the first side plate and the second side plate, the rotational actuator configured to rotate the body portion about a first rotational axis with respect to the boom; a rotational bearing coupled to the top plate; a connecting arm coupled to the rotational bearing; and a motor configured to drive the rotational bearing to rotate the connecting arm about a second rotational axis having an orientation differing from the first rotational axis, wherein at least one of the body portion or the connecting arm includes a mounting site configured to removably couple to one or more implements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. In the figures, the use of the same reference numbers in different instances in the description and the figures may indicate similar or identical items.

DETAILED DESCRIPTION

Figure 1A:
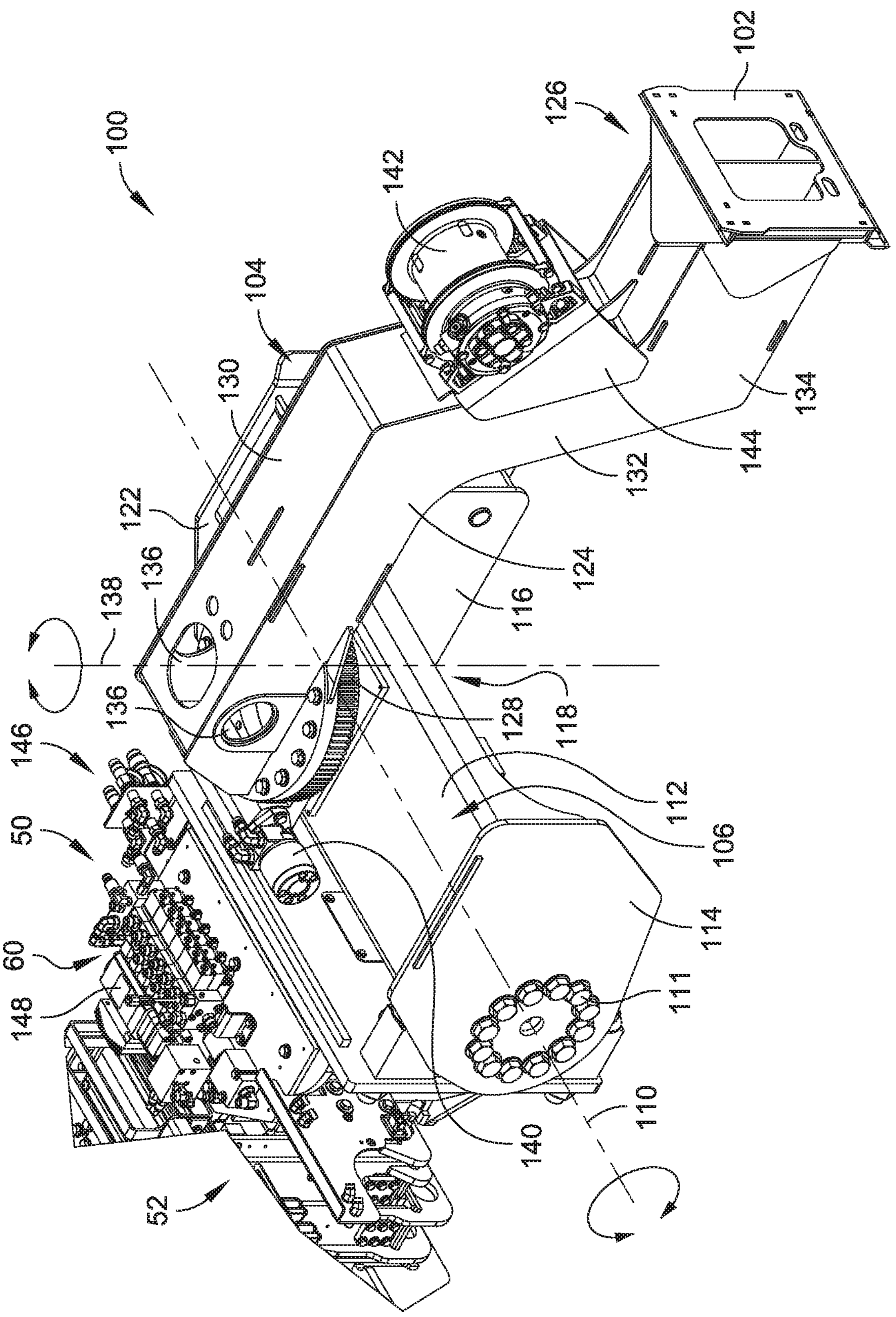
FIG. 1A is an isometric front view of a rotatable boom attachment in accordance with example implementations of the present disclosure.

Referring to FIGS. 1A through 9, a boom attachment 100 is shown in accordance with example implementations of the present disclosure. In implementations, the boom attachment 100 couples to a distal end 50 of a boom 52, for example, as shown in FIG. 2A. Referring to FIG. 2B, the boom 52 can be mounted to a vehicle 54 to transport the boom 52 and any attachments. For example, the boom 52 can be rotatably mounted to the vehicle 54 via a turret rotation bearing to moveably position the boom 52 about a horizontal plane (rotation shown diagrammatically as 56). The boom 52 includes telescoping sections that extend and retract the boom 52 to provide a variety of length configurations of the boom 52. For example, the boom 52 can be in retracted states for storage or transport and can be in extended states during use to position the distal end 50 and any attachments at elevated or otherwise extended positions.

Figure 1B:
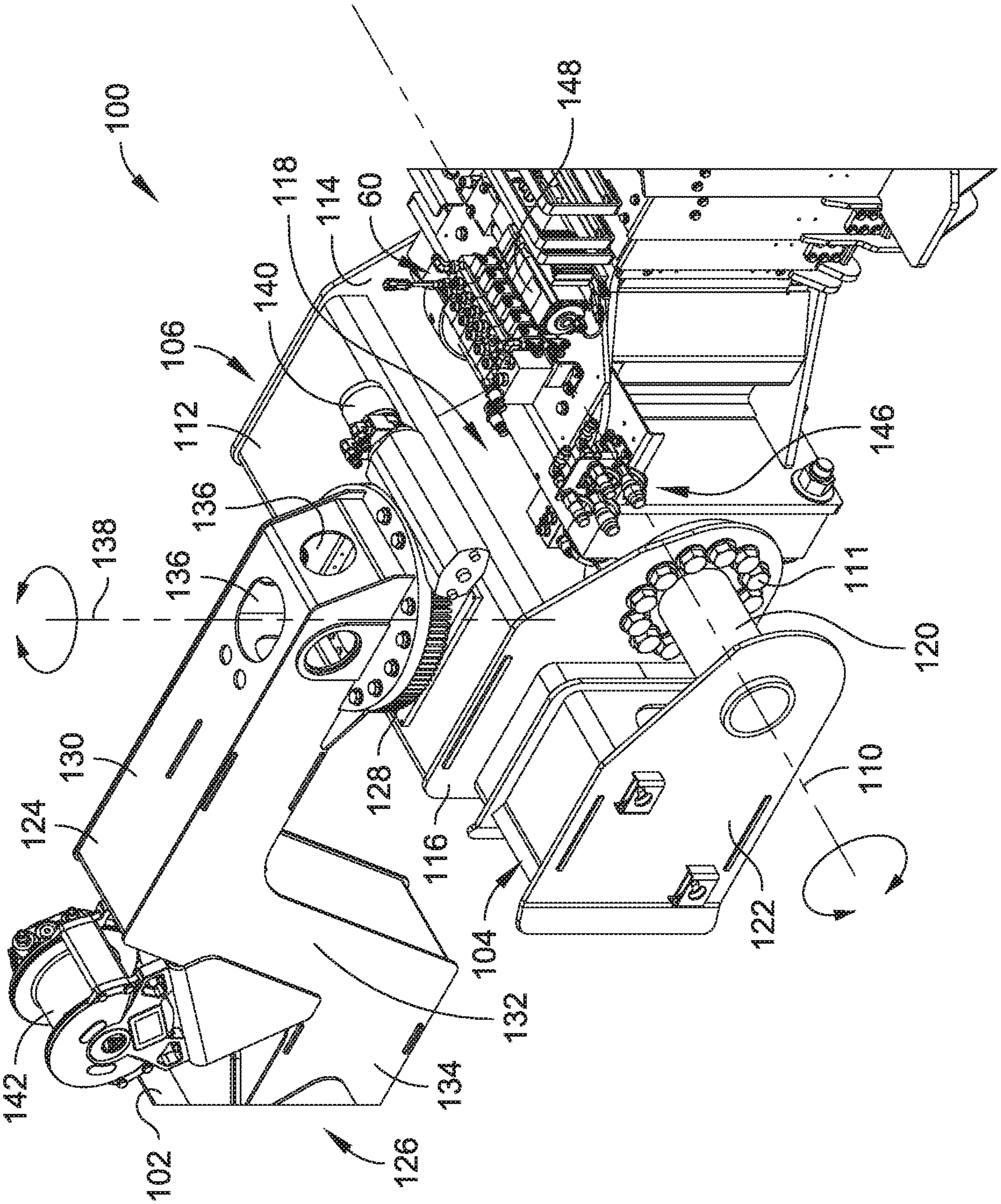
FIG. 1B is an isometric back view of the rotatable boom attachment of FIG. 1A.
Figure 2A:
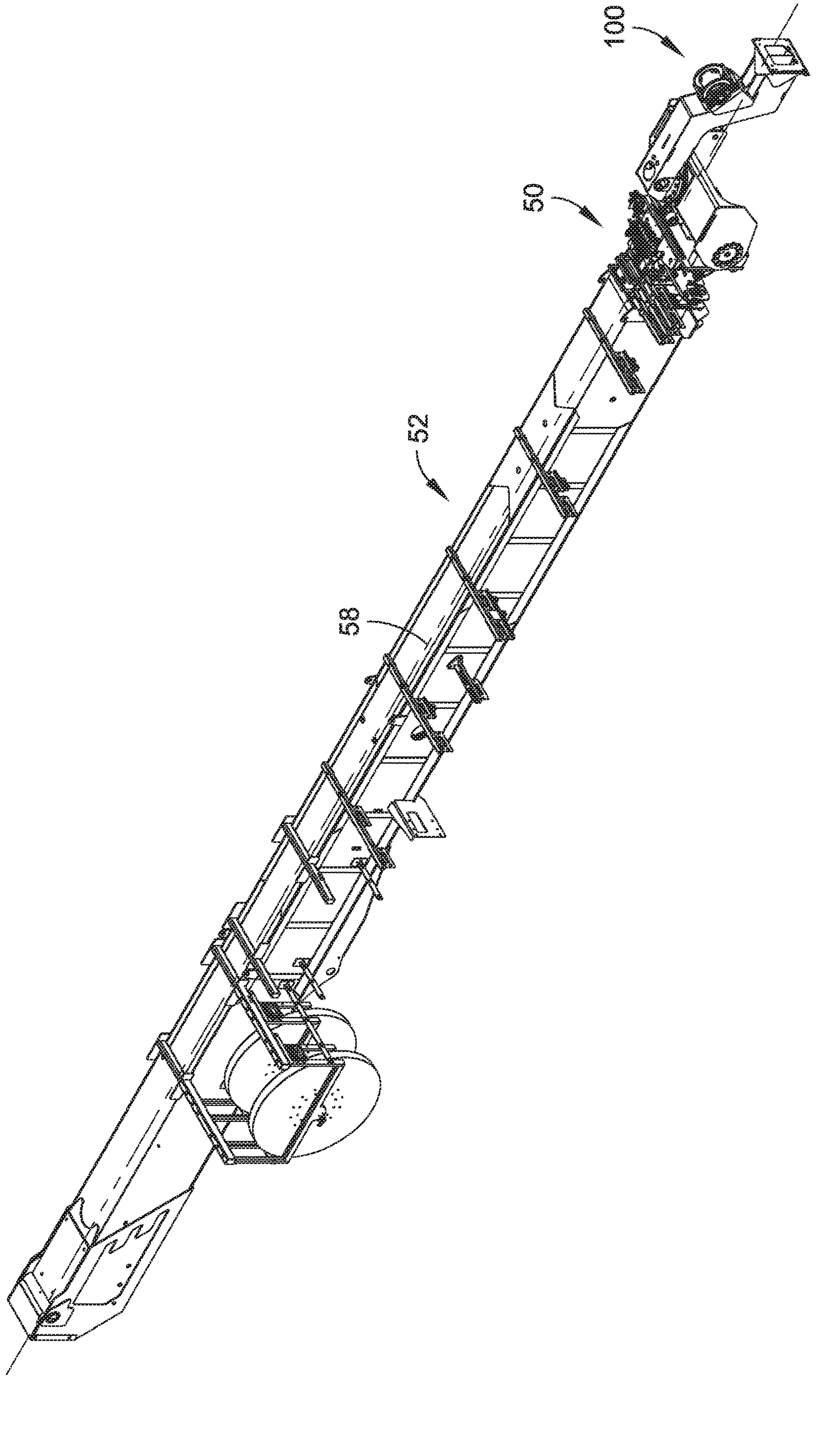
FIG. 2A is an isometric view of the rotatable boom attachment of FIG. 1A shown attached to an extendable boom.
Figure 2B:
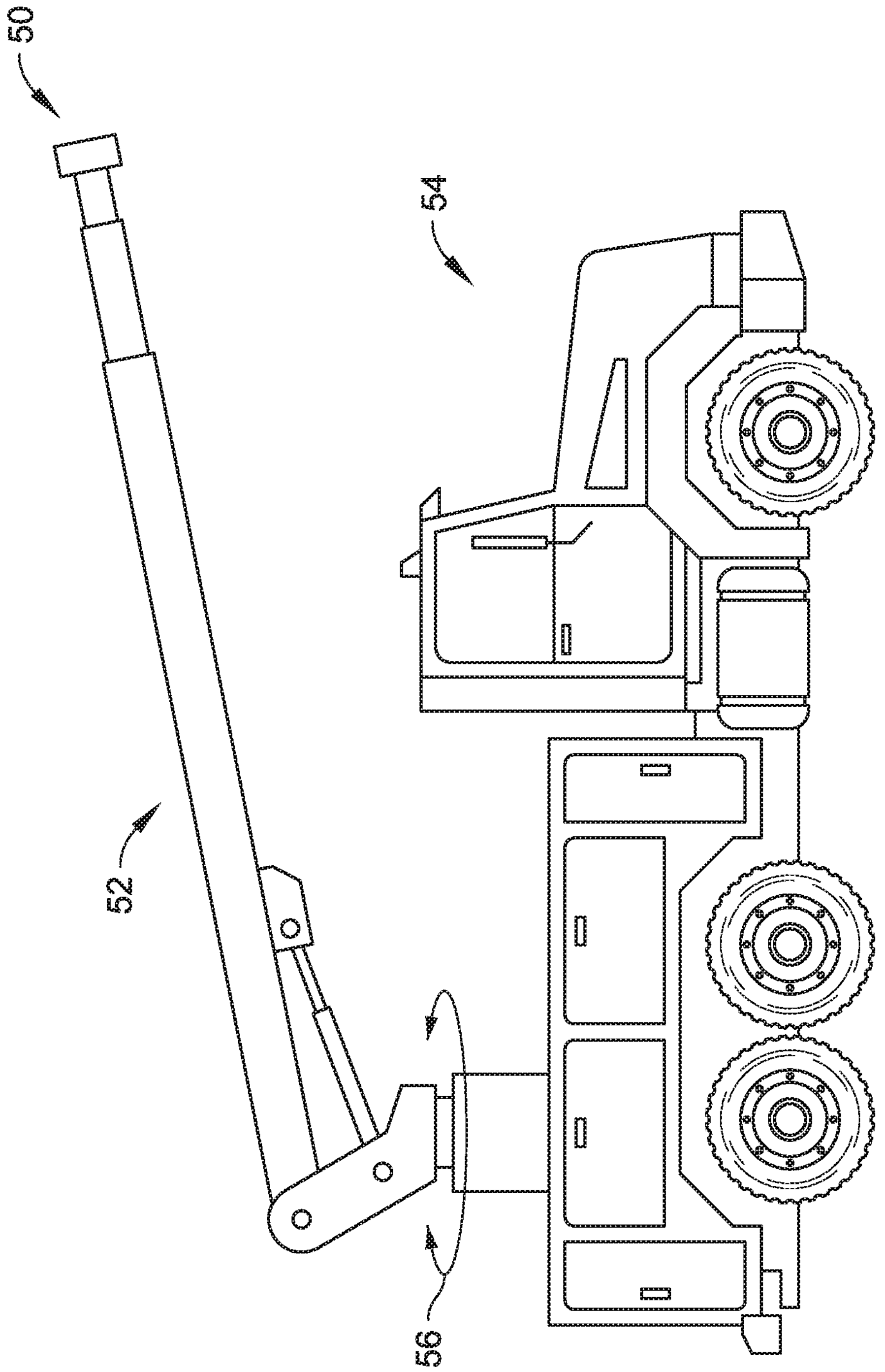
FIG. 2B is a diagrammatic side view of an extendable boom mounted to a vehicle.
Figure 3:
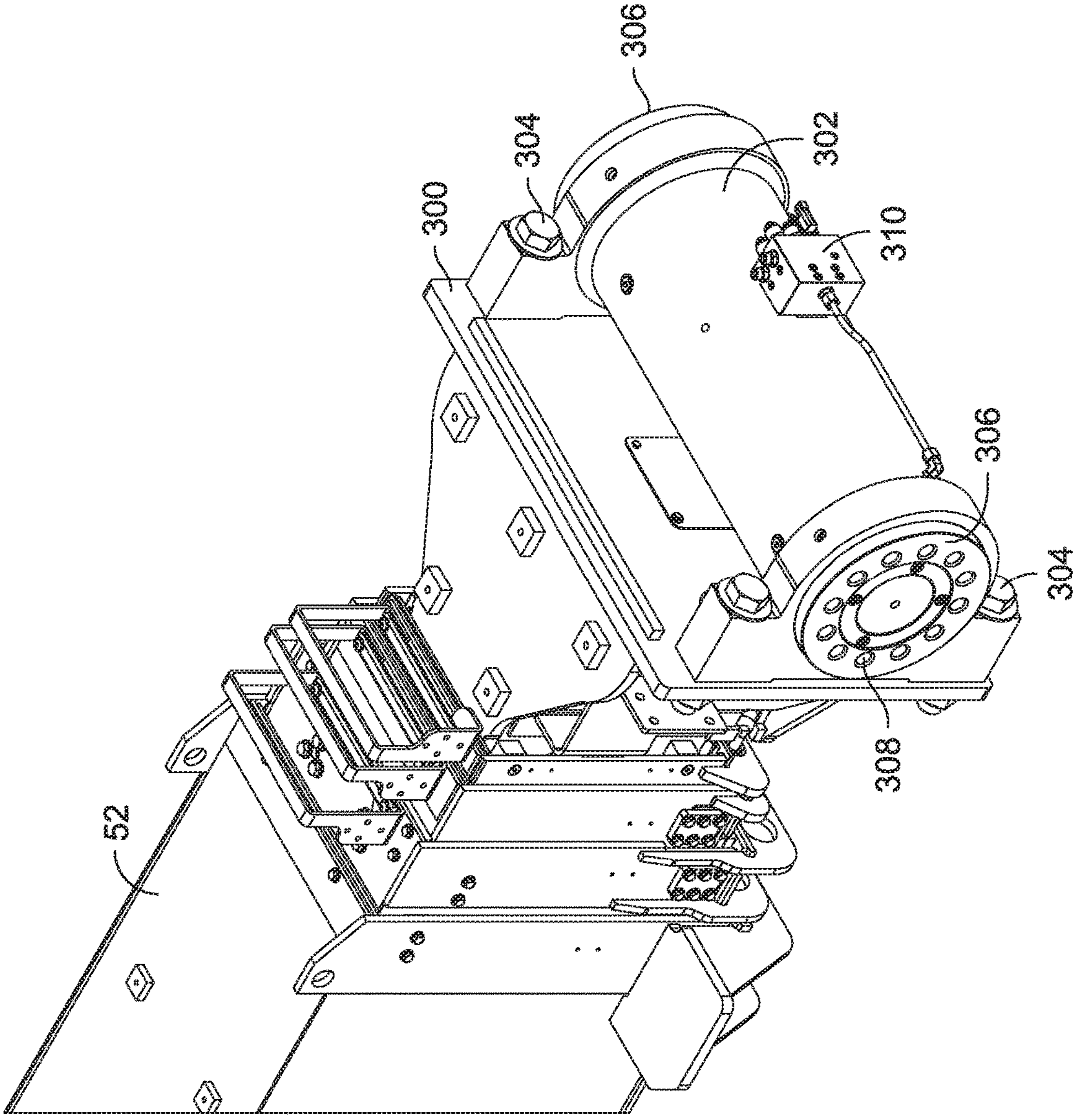
FIG. 3 is an isometric view of a rotational actuator of the rotatable boom attachment of FIG. 1A coupled to an end of the extendable boom in accordance with example implementations of the present disclosure.

The boom attachment 100 includes one or more mounting sites to detachably couple one or more additional booms, jibs, or mounting structures of equipment, or combinations thereof, to permit the boom attachment 100 to serve as a securing platform for multiple types of equipment in an interchangeable manner with respect to the boom 52. The boom attachment 100 also provides multiple axes of rotation of equipment mounted thereto independent of motion of the boom 52, as described further herein. The boom attachment 100 is shown in FIGS. 1A and 1B with a first mounting site 102 and a second mounting site 104, each configured to receive or otherwise couple to a boom, a jib, a utility platform, or other equipment (e.g., a pole-grab structure, a sheave with a winch line, a nozzle attached with a hose for spraying hot wire cleaning fluid, a phase lifter or other structure to support elevated power lines, etc.). The mounting sites can be configured as male connectors, female connectors, or other connector type to receive a corresponding connector associated with the equipment type to be supported by the boom attachment 100. The equipment can be removably attached to the mounting sites of the boom attachment 100, such as through bolts, pins, slidable receivers, friction fit, or the like, or combinations thereof, to secure the equipment in a first configuration and to remove the equipment from the mounting sites in a second configuration, such as to facilitate introduction of a different piece of equipment to the respective mounting site.

Figure 6:
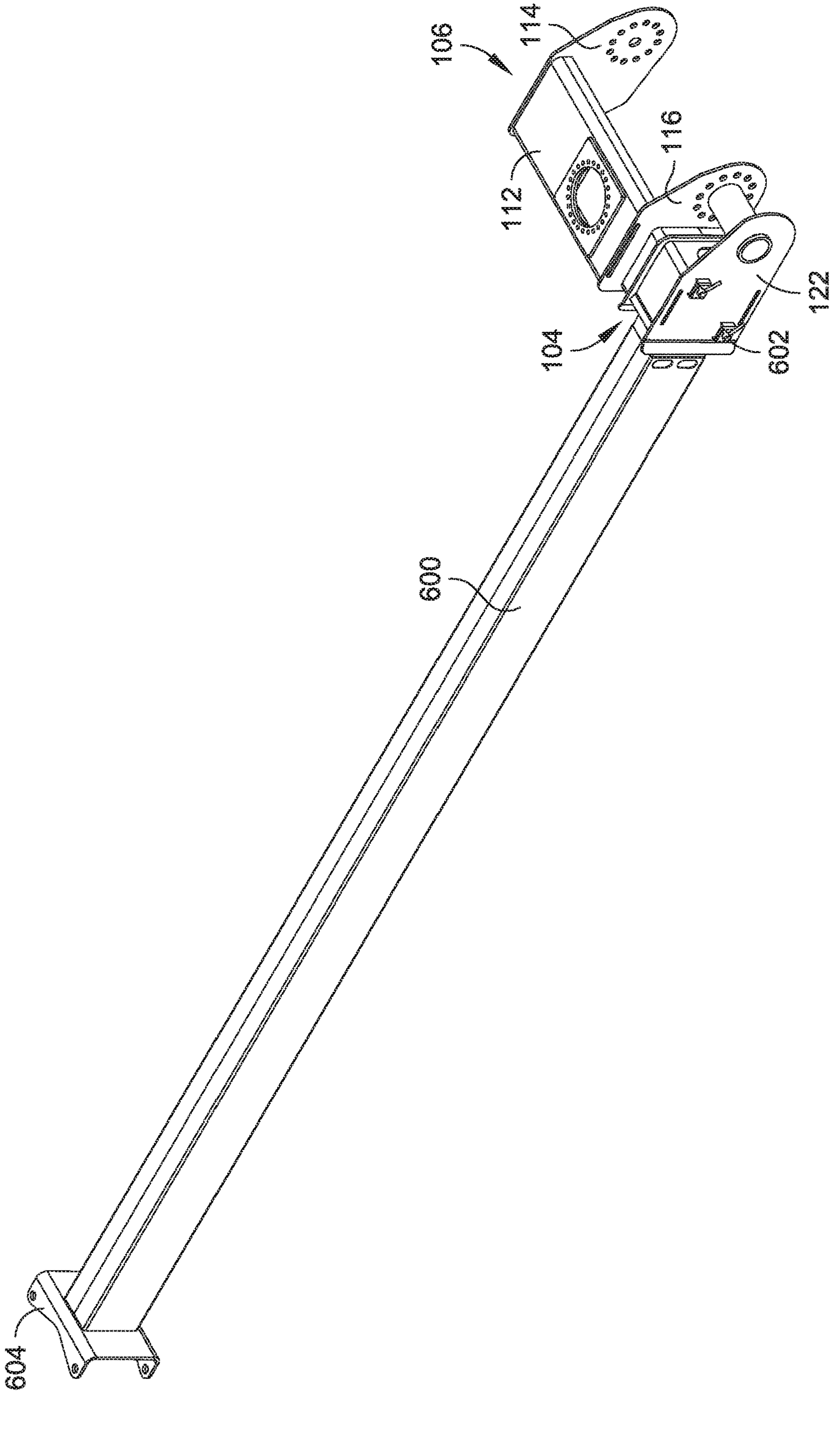
FIG. 6 is an isometric view of a boom insert coupled to a portion of the rotatable boom attachment in accordance with example implementations of the present disclosure.
Figure 7:
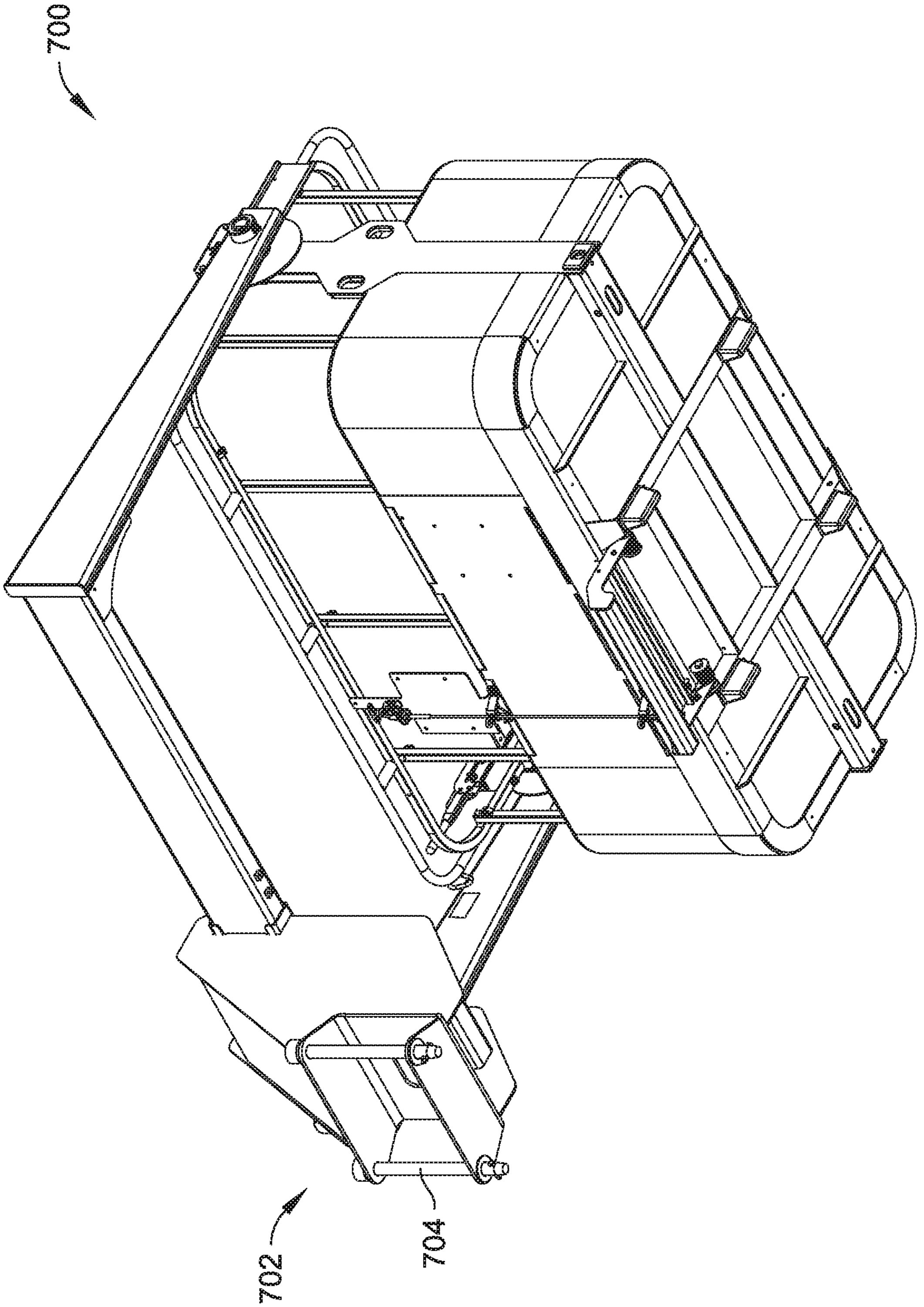
FIG. 7 is an isometric view of a utility platform configured to couple to one or more mounting sites of the rotatable boom attachment of FIG. 1A, such as via the boom insert of FIG. 6.
Figure 8:
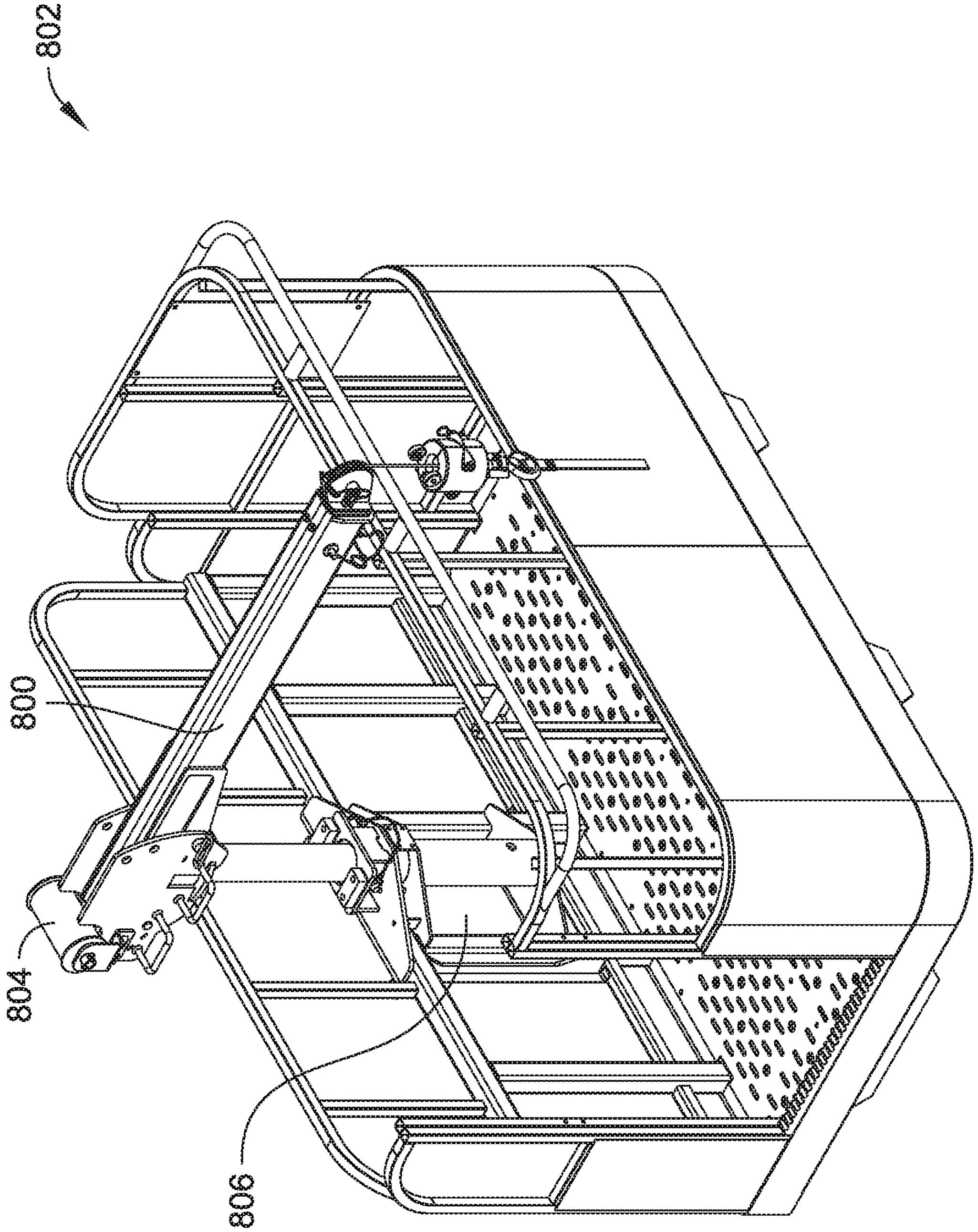
FIG. 8 is an isometric view of a utility platform configured to couple to one or more mounting sites of the rotatable boom attachment of FIG. 1A, where the utility platform supports a material handling jib.
Figure 9:
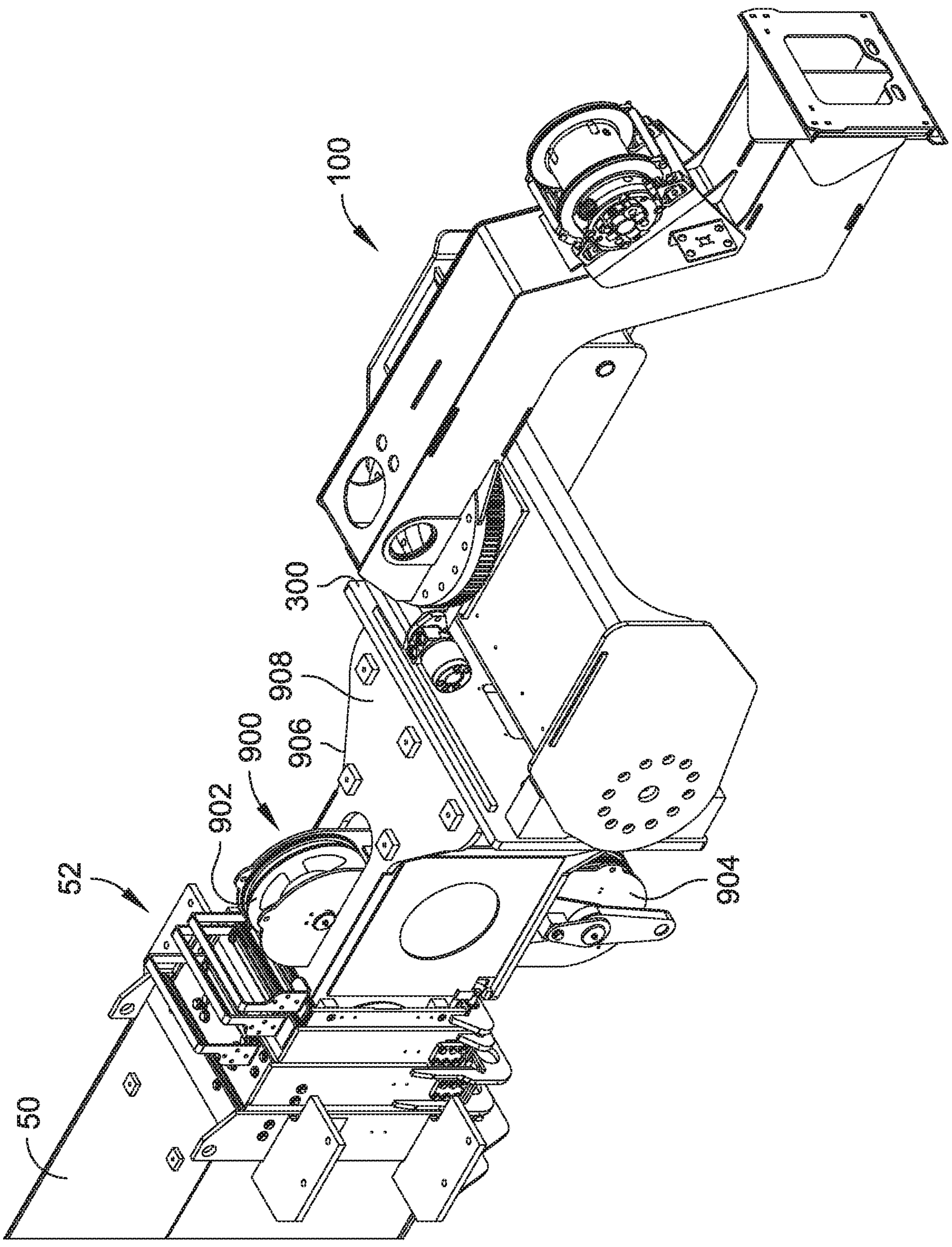
FIG. 9 is an isometric front view of the rotatable boom attachment of FIG. 1A with a main boom winch load line positioned at an end of the boom in accordance with example implementations of the present disclosure.

The first mounting site 102 is shown as a mounting plate over which a receiver for equipment, such as a utility platform with a material handling jib and winch (e.g., shown in FIG. 8), can be positioned to securely and removably mount the equipment to the first mounting site 102 of the boom attachment 100. For example, FIG. 8 shows a utility platform 802 having a receiver 806 to slide over the mounting plate of the first mounting site 102, where fasteners can secure the receiver 806 in place. The second mounting site 104 is shown as a female receiver mount to receive a male attachment portion of a boom or other equipment. For example, FIG. 6 shows an example boom 600 inserted into the second mounting site 104, secured in position by pins 602, however other attachment mechanisms can be utilized, such as bolts or other fasteners. In one implementation, the boom 600 can be made from a dielectric material (e.g., fiberglass) to facilitate high-voltage installation and maintenance environments, where the second mounting site 104 can also support non-insulated equipment in an interchangeable manner, such as, for example, introducing the boom 600 made from a metallic material (e.g., steel, steel alloy, etc.). While the boom attachment 100 is shown with two mounting sites, the boom attachment 100 is not limited to two mounting sites, where the boom attachment 100 can include fewer than two mounting sites or more than two mounting sites. Multiple mounting sites increase the amount of implements or equipment that can be manipulated by the boom attachment 100, providing flexibility in the layout and performance capabilities of the boom attachment 100. In an example implementation, the boom 600 is coupled to the second mounting site 104 to support a utility platform (e.g., shown in FIG. 7) at an end 604 of the boom 600 distal to the second mounting site 104. For example, FIG. 7 shows a utility platform 700 having a receiver 702 to couple with the end 604 of the boom 600 attached to the second mounting site 104, where fasteners 704 secure the receiver 702 in place relative to the boom 600. The utility platform 700 can be configured for high-voltage installation and maintenance environments (e.g., a 500 kilovolt (kV) aerial device) through insulated coupling structures, such as fiberglass structures, fiberglass boom, etc.

The boom attachment 100 includes a body portion 106 that couples to the distal end 50 of the boom 52 (e.g., via bolt or other fastener). The body portion 106 rotates with respect to the boom 52 to provide vertical rotation of the boom attachment 100 with respect to the boom 52. In implementations, the body portion 106 houses or is otherwise coupled to a rotational actuator or other rotational device to rotate the boom attachment 100 in a vertical direction with respect to the boom 52. For example, referring to FIG. 3, the boom 52 includes a mounting plate 300 onto which a rotational actuator 302 is mounted via fasteners 304 (e.g., bolts). Alternatively or additionally, the boom attachment 100 includes the mounting plate 300 or an additional mounting structure to interface with the boom 52. In implementations, the rotational actuator 302 is a hydraulic rotational actuator that translates hydraulic forces into rotation of structures mounted to opposing ends 306 of the rotational actuator 302. For instance, each end 306 can define a plurality of apertures 308 into which fasteners (e.g., bolts) can be inserted to secure structures to the rotational actuator 302 to provide vertical rotation of the structure relative to the boom 52. In implementations, hydraulic fluids are made available to the boom attachment 100 via hydraulic valves 60 supported by the boom 52 (e.g., at the distal end), via hydraulic controller located on or in the turret of the vehicle 54, via hydraulic controller positioned in another location of the vehicle 54, or combinations thereof. For example, the hydraulic valves 60 can control application of hydraulic forces to the rotational actuator 302 to provide the desired rotational direction when an implement is secured to the boom attachment 100 at the first mounting site 102. In implementations, the rotational actuator 302 includes a controller 310 configured to hold the position of the rotational actuator 302 when a desired working position is obtained and configured to select which hydraulic controller controls positioning of the rotational actuator 302. For instance, the controller 310 can include a holding valve to hold the position of the rotational actuator 302 when a desired working position is obtained, and can include a valve to select which hydraulic control valve has control over application of hydraulic fluids to the rotational actuator 302. For example, the valve of the controller 310 can select the hydraulic valves 60 to apply hydraulic fluids to the rotational actuator 302 when an implement is secured to the boom attachment 100 at the first mounting site 102 and can select the hydraulic controller at the turret of the vehicle 54 when an implement is secured to the boom attachment 100 at the second mounting site 104. While a hydraulic rotational actuator is described herein, the boom attachment 100 is not limited to a hydraulic rotational actuator and can include different rotational mechanisms (including but not limited to, rotational linkages) in addition to or instead of a hydraulic rotational actuator to rotate the boom attachment 100 in a vertical direction with respect to the boom 52. Rotational linkages may impart a varying angular velocity during rotation of the body portion 106, which can result in changing speeds of equipment mounted to the first mounting site 102 or the second mounting site 104. A hydraulic rotational actuator can provide a constant speed during of equipment mounted to the first mounting site 102 or the second mounting site 104, which can provide stability to equipment and/or personnel supported by the boom attachment 100.

Figure 4:
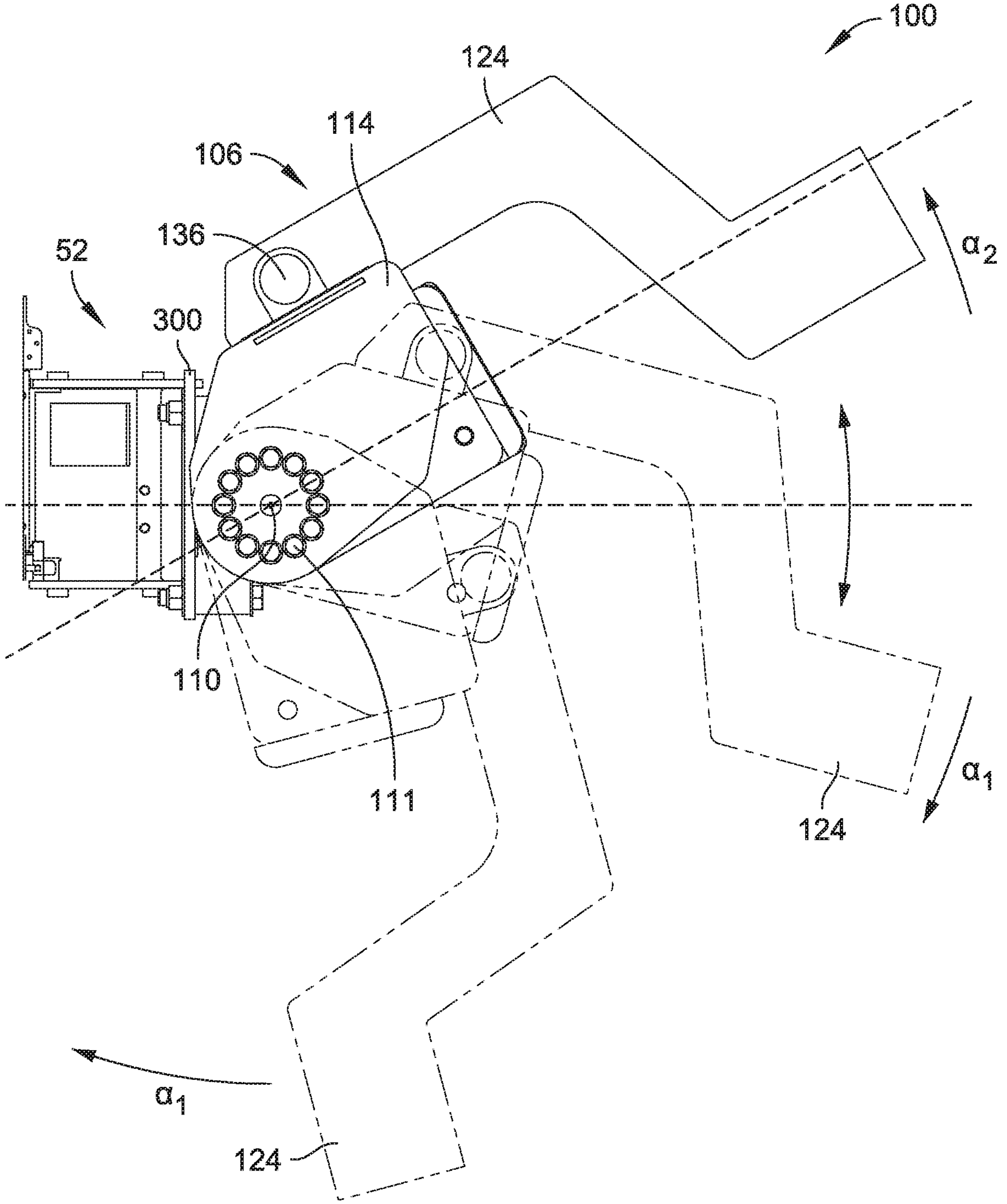
FIG. 4 is a diagrammatic side view of the rotatable boom attachment of FIG. 1A shown rotating about a first rotational axis.

In example implementations, the rotational actuator 302 rotates the body portion 106 about a first rotational axis 110 at an angle of about 270 degrees. For example, the body portion 106 can be positioned around the rotational actuator 302 and secured in place through fasteners 111 (e.g., bolts shown in FIG. 1A) interfacing with the apertures 108 of the rotational actuator 302. Referring to FIG. 4, an example rotational positioning of the body portion 106 is shown where the rotational actuator 302 rotates the body portion 106 about the first rotational axis 110 over an angle of about 210 degrees, where in a first position brings the boom attachment 100 in close proximity or contact with an underside of the boom 52 at zero degrees, raises the boom attachment 100 to extend a maximum distance from the boom 52 at 180 degrees (e.g., $\alpha_1$), and raises the boom attachment 100 to be positioned at a 30-degree angle (e.g., $\alpha_2$) from the longitudinal direction of the boom 52. In implementations, the boom attachment 100 can extend beyond the 30-degree angle from the longitudinal direction of the boom 52, such as to hyperarticulate above the boom 52.

The body portion 106 includes the first mounting site 102, where positioning of an implement received by or mounted to the first mounting site 102 or to the second mounting site 104 can be controlled through rotation of the body portion 106 (e.g., via activation of the rotational actuator 302), through vertical positioning of the boom 52 and through horizontal rotation of the boom 52 (e.g., about 56 shown in FIG. 2B) via the rotational mount of the boom 52 to the vehicle 54. The boom attachment 100 can also provide an additional axis of rotation of the first mounting site 102, as described further herein.

In implementations, the body portion 106 includes a top plate 112 connected with a first side plate 114 and a second side plate 116 to form an interior region 118 into which the rotational actuator 302 is positioned during rotation of the body portion about the rotational actuator 302. The rotational actuator 302 is shown secured to each of the first side plate 114 and the second side plate 116 via fasteners 111 introduced to apertures 308 at the ends 306 of the rotational actuator 302. The second side plate 116 is shown coupled with an extender 120, which in turn is coupled with a receiver side plate 122. In implementations, the receiver side plate 122 forms an opening for the second mounting site 104 to receive a portion of the equipment to be mounted to the body portion 106 at the second mounting site 104 (e.g., as shown in FIG. 6). The extender 120 can be sized to provide a predetermined width of the second mounting site 104, where the width can correspond to a width of the portion of the equipment to be mounted at the second mounting site 104. In implementations, the second mounting site 104 is positioned offset from the boom 52 (e.g., offset from a longitudinal midline of the boom 52, shown as 58 in FIG. 2A). However, the second mounting site 104 could be positioned elsewhere relative to the body portion 106 to provide differing positions of the second mounting site 104 relative to the boom 52 when the boom attachment 100 is secured to the distal end 50 of the boom 52.

The boom attachment 100 also includes a connecting arm 124 rotationally coupled to the body portion 106 with the first mounting site 102 mounted to an end 126 of the connecting arm 124. However, the first mounting site 102 could be positioned along a different portion of the connecting arm 124 to provide differing positions of the second mounting site 102 relative to the boom 52 when the boom attachment 100 is secured to the distal end 50 of the boom 52. The boom attachment 100 is shown with a rotational bearing 128 coupled between the top plate 112 and the connecting arm 124 to rotatably couple the connecting arm 124 to the body portion 106 to provide rotation of the boom attachment 100 relative to the boom 52 about a second rotational axis 138. For example, the connecting arm 124 can be mounted to an upper surface of the rotational bearing 128 and can include a first portion 130 extending outwardly from the body portion 106 (e.g., in a direction away from the boom 52). The connecting arm 124 can also include a second portion 132 extending downwardly from the first portion 130 which then extends outwardly as a third portion 134 coupled with the first mounting site 102. Such configuration can position the first mounting site 102 substantially along the longitudinal midline 58 of the boom 52 when the first mounting site 102 is fully extended from the boom 52 (e.g., through operation of the rotational bearing 128). In implementations, the connecting arm 124 defines one or more apertures 136 to facilitate installation and/or access to the rotational bearing 128, distribution of hydraulic hoses, distribution of electrical wiring, or the like. The second rotational axis 138 is shown as being substantially perpendicular to the first rotational axis 110, however other configurations of the first rotational axis 110 relative to the second rotational axis 138 can be utilized.

Figure 5:
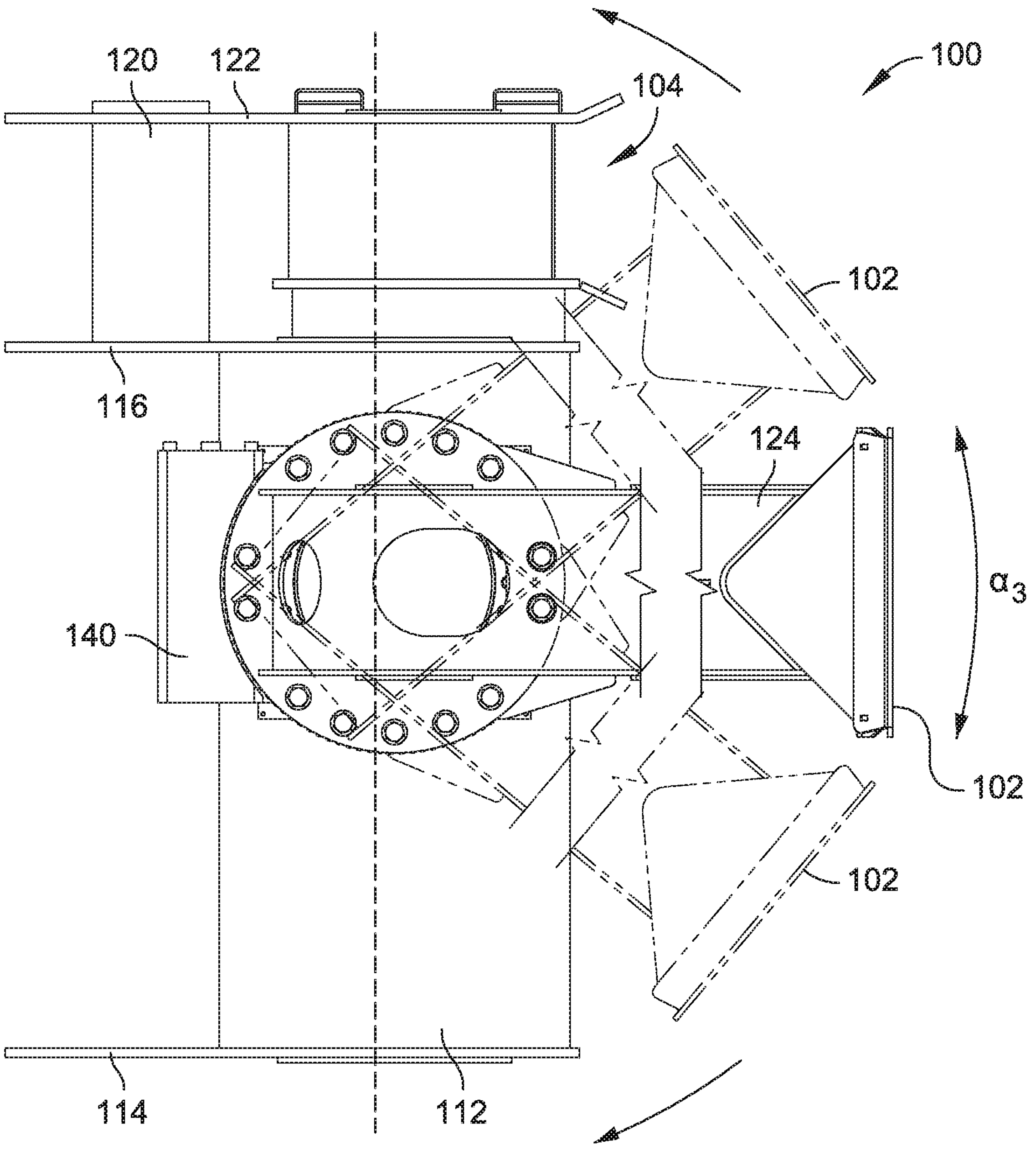
FIG. 5 is a partial top view of the rotatable boom attachment of FIG. 1A shown rotating about a second rotational axis.

The boom attachment 100 includes a motor 140 configured to drive the rotational bearing 128. In implementations, the motor 140 is a hydraulic motor that rotates a gear (e.g., a worm gear) in contact with teeth of the rotational bearing 128 to provide rotation of the rotational bearing 128 and the coupled connecting arm 124 about the second rotational axis 138. Hydraulic fluids can be made available to the motor 140 via the hydraulic valves 60 supported by the boom 52. In example implementations, activation of the rotational bearing 128 causes rotation of the connecting arm 124 about the second rotational axis 138 at an angle of about 180 degrees. For example, FIG. 5 shows rotation of the connecting arm 124 relative to the top plate 112 over across an angle of about 180 degrees (e.g., $\alpha_3$). However, in other implementations, the boom attachment 100 can operate at angles exceeding 180 degrees, which can be limited by potential physical interference of equipment supported by the boom attachment 100 with the boom 52 during operation. In implementations, the connecting arm 124 includes the first mounting site 102 at a distal end of the connecting arm 124 to secure equipment (e.g., boom, jib, utility platform, material handling equipment, etc.) to the boom attachment 100 at a position furthest from the boom 52. While the boom attachment 100 is shown with the second portion 132 extending beneath the connection between the rotational bearing 128 and the first portion 130, in some implementations, the connecting arm 124 is positioned above the boom 52 during rotation by the motor 140, which can permit 360 degree rotation of the connecting arm 124. For example, the second portion 132 can extend upwardly from the first portion 130 to avoid physical interference between the third portion 134 of the connecting arm 124 and the boom 52 during rotation of the connecting arm 124 via the rotational bearing 128.

The boom attachment 100 provides multiple options for positioning equipment mounted to either of the first mounting site 102 or the second mounting site 104. For instance, each of the first mounting site 102 and the second mounting site 104 can be positioned through vertical, horizontal (e.g., about 56 shown in FIG. 2B), and/or telescoping movement of the boom 52. Additionally, each of the first mounting site 102 and the second mounting site 104 can be positioned through rotation of the body portion 106 about the first rotational axis 110 through operation of the rotational actuator 302. The first mounting site 102 can also be positioned through rotation about the second rotational axis 138 through operation of the motor 140 turning the rotational bearing 128. Each of the positioning options can be performed as a single movement or as a combined movement with other positioning options. For example, the second mounting site 104 can be positioned through a combination of movements of the boom 52 and of the body portion 106 about the first rotational axis 110. As another example, the first mounting site 102 can be positioned through a combination of movements of the boom 52 and of the body portion 106 about the first rotational axis 110 or through a combination of movements of the body portion 106 about the first rotational axis 110 and of the connecting arm 124 about the second rotational axis 138, or the like.

In implementations, the boom attachment 100 includes leveling structures to provide self-leveling of equipment secured to the body portion 106 via the mounting sites (e.g., the first mounting site 102, the second mounting site 104, etc.). For instance, the boom attachment 100 can include a control system coupled to or included in one or more of the rotational actuator 302, the controller 310, the hydraulic valves 60, a hydraulic fluid controller, the drive for the rotational bearing 128 (e.g., motor 140), or combinations thereof to rotate the body portion 106 or the connecting arm 124 to provide a level platform for the mounting sites. In an implementation, the control system includes one or more level sensors in communication with one or more hydraulic valves to control actuation of the rotational actuator 302 based on output of the level sensor. The level sensor can include, but is not limited to, a digital inclinometer.

In implementations, the connecting arm 124 includes a material handling winch 142 to facilitate transfer of supplies to a utility platform coupled to the first mounting site 102 or the second mounting site 104. For example, the material handling winch 142 can include a motor (e.g., hydraulic motor, electric motor, other motor, etc.) to turn the winch to spool a cable supported by a material handling jib (e.g., jib 800 coupled to a utility platform 802 shown in FIG. 8) secured to the utility platform coupled to the first mounting site 102. In implementations, the material handling winch 142 is coupled to the connecting arm 124 via a mounting bracket 144. For example, the mounting bracket 144 can be coupled between the material handling winch 142 and the second portion 132 of the connecting arm 124. The material handling winch 142 can spool and unspool cable under control by the motor to raise and lower a crane hook or other attachment, such as to bring materials up to personnel in a utility platform secured to the boom attachment 100 via the first mounting site 102, the second mounting site 104, or another mounting site. In implementations, the cable is supported by the material handling jib 800 which can include a roller 804 to guide the cable from the material handling winch 142 to provide a load line to secure materials from the ground to the utility platform or from the utility platform to the ground.

The boom attachment 100 can facilitate application of a main boom winch load line. For example, referring to FIG. 9, the distal end 52 of the boom 50 includes a sheavehead 900 supporting an upper sheave 902 and a lower sheave 904 to hold one or more load lines. The sheavehead 900 is mounted to a support 906 attached to the boom 50 at the distal end 52. In implementations, the support 906 also includes the hydraulic valves 60 and associated connections attached to an upper surface 908 of the support 906. The support 906 is further attached to the mounting plate 300 that holds the boom attachment 100 to the boom 50 as described herein. For example, the sheavehead 900 can be positioned between the boom attachment 100 and the boom 50. In implementations, the boom attachment 100 includes the sheavehead 900 and support 906. Alternatively or additionally, portions of the sheavehead 900 and support 906 can be included as a portion of the boom 50.

The boom 52 can be configured to facilitate tool usage with equipment mounted to the mounting sites of the boom attachment 100 or to provide personnel working on or in utility platforms secured to the mounting sites. For example, the boom 52 can include a tool connection portion 146 positioned at the distal end 50 of the boom. The tool connection portion 146 can include, for example a hydraulic tool circuit connector, to supply hydraulic power to one or more tools supported by the boom attachment 100. For example, personnel working on a utility platform supported by one or more of the first mounting site 102 or the second mounting site 104 can utilize tools powered at least in part through the hydraulic power supplied by fluid lines coupled with the hydraulic tool circuit connector. Such tools can include, but are not limited to, crimpers, saws, and the like. In implementations, the hydraulic tool circuit connector is fluidically coupled with the hydraulic valves 60 to provide hydraulic power to the hydraulic tool circuit connector which in turn can transfer to the tools via fluid connection hoses or the like.

In implementations, the boom 52 includes a hydraulic generator 148 disposed at the distal end of the boom 52. The hydraulic generator 148 is configured to convert hydraulic forces to electric power to supply to various portions of the boom attachment 100. For example, the electric power can be utilized by personnel working on a utility platform supported by one or more of the first mounting site 102 or the second mounting site 104, control systems of the boom attachment 100 (e.g., solenoids of the self-leveling structures), or by other individuals or systems. The hydraulic generator 148 can be fluidically coupled with the hydraulic valves 60 to provide hydraulic fluid to the hydraulic generator 148 which in turn converts the hydraulic fluid forces to electric power. The hydraulic generator 148 can avoid running substantial gauges or amounts of electrical wiring along the boom 52 to the boom attachment 100.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A boom attachment comprising:

a body portion configured to couple to a distal end of a boom, the body portion coupled with a rotational actuator configured to rotate the body portion about a first rotational axis with respect to the boom, the body portion including a top plate coupled with a first side plate and a second side plate opposing the first side plate, the body portion further including a receiver side plate and an extender coupled between the receiver side plate and the second side plate;

a connecting arm rotatably coupled to the body portion; and a motor configured to drive the connecting arm about a second rotational axis having an orientation differing from the first rotational axis, wherein the connecting arm includes a first mounting site configured to removably couple to one or more implements, and where the body portion includes a second mounting site positioned between the receiver side plate and the second side plate.

2. The boom attachment of claim 1, wherein the rotational actuator includes a hydraulic rotational actuator.

3. The boom attachment of claim 1, wherein the body portion defines an interior region into which the rotational actuator is positioned during rotation of the body portion about the first rotational axis.

4. The boom attachment of claim 3, wherein the rotational actuator includes opposing ends coupled to at least one of the first side plate or the second side plate.

5. The boom attachment of claim 4, wherein the opposing ends are respectively coupled to the first side plate and the second side plate.

6. The boom attachment of claim 1, further comprising a rotational bearing coupled between the body portion and the connecting arm.

7. The boom attachment of claim 6, further comprising a gear positioned to interact with the rotational bearing, wherein the motor is configured to drive the gear to rotate the connecting arm about the second rotational axis through interaction between the gear and the rotational bearing.

8. The boom attachment of claim 1, wherein the connecting arm includes the first mounting site at an end of the connecting arm distal from connection between the body portion and the connecting arm.

9. The boom attachment of claim 1, wherein the first rotational axis is substantially perpendicular to the second rotational axis.

10. A boom attachment comprising:

a body portion configured to couple to a distal end of a boom, the body portion coupled with a rotational actuator configured to rotate the body portion about a first rotational axis with respect to the boom;

a connecting arm rotatably coupled to the body portion, wherein the connecting arm includes a first portion extending outwardly from the body portion, a second portion extending downwardly from the first portion, and a third portion extending outwardly from the second portion; and a motor configured to drive the connecting arm about a second rotational axis having an orientation differing from the first rotational axis, wherein at least one of the body portion or the connecting arm includes a mounting site configured to removably couple to one or more implements.

11. The boom attachment of claim 10, wherein the connecting arm includes the mounting site coupled to the third portion.

12. A boom attachment comprising:

a body portion configured to couple to a distal end of a boom, the body portion defining an interior region formed from a top plate coupled with a first side plate and a second side plate opposing the first side plate, the body portion including a receiver side plate and an extender coupled between the receiver side plate and the second side plate;

a rotational actuator positioned at least partially within the interior region and coupled between the first side plate and the second side plate, the rotational actuator configured to rotate the body portion about a first rotational axis with respect to the boom;

a rotational bearing coupled to the top plate;

a connecting arm coupled to the rotational bearing; and a motor configured to drive the rotational bearing to rotate the connecting arm about a second rotational axis having an orientation differing from the first rotational axis, wherein the connecting arm includes a first mounting site configured to removably couple to one or more implements, and where the body portion includes a second mounting site positioned between the receiver side plate and the second side plate.

13. The boom attachment of claim 12, wherein the rotational actuator includes a hydraulic rotational actuator.

14. The boom attachment of claim 12, wherein the first rotational axis is substantially perpendicular to the second rotational axis.

15. A boom attachment comprising:

a body portion configured to couple to a distal end of a boom, the body portion defining an interior region formed from a top plate coupled with a first side plate and a second side plate opposing the first side plate;

a rotational actuator positioned at least partially within the interior region and coupled between the first side plate and the second side plate, the rotational actuator configured to rotate the body portion about a first rotational axis with respect to the boom;

a rotational bearing coupled to the top plate;

a connecting arm coupled to the rotational bearing, wherein the connecting arm includes a first portion extending outwardly from the rotational bearing, a second portion extending downwardly from the first portion, and a third portion extending outwardly from the second portion; and a motor configured to drive the rotational bearing to rotate the connecting arm about a second rotational axis having an orientation differing from the first rotational axis, wherein at least one of the body portion or the connecting arm includes a mounting site configured to removably couple to one or more implements, wherein the connecting arm includes the mounting site coupled to the third portion.

* * * * *